United States Patent Office 2,757,181
Patented July 31, 1956

2,757,181

LOWER ALKYL 2,5-DI(LOWER ALKOXY)-2-TETRA-HYDROFUROYL ACETATE AND PROCESS FOR PREPARING SAME

Niels K. F. W. Clauson-Kaas, Haifa, Israel, assignor to A/S Sadolin & Holmblad, Copenhagen, Denmark No Drawing. Application February 15, 1955, Serial No. 488,406

9 Claims. (Cl. 260—347.5)

This invention relates to a new process for preparing the known 2,3-dihydroxybenzoic acid (o-pyrocatechuic acid) and esters thereof and to new intermediates utilizable in the preparation thereof.

The process of this invention essentially comprises converting a 2,5-dialkoxy-2-tetrahydrofuroic acid ester to a 2,5-dialkoxy-2-tetrahydrofuroyl acetic acid ester, and thence to 2,3-dihydroxy-benzoic acid and an ester thereof.

This series of steps can be represented schematically by the following equations:

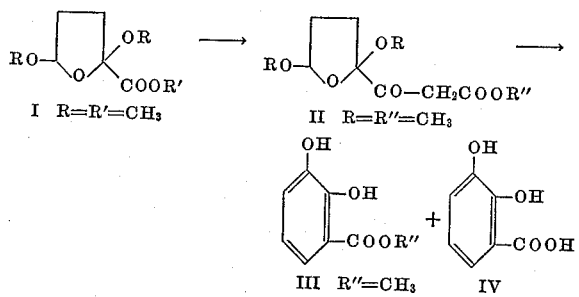

The 2,5-dialkoxy-2-tetrahydrofuroic acid esters are known compounds which can be prepared from furoic acid esters as disclosed in an article in Acta Chemica Scandinavica, 6, 551–555 (1952). Representative of these starting materials are the lower alkyl 2,5-di(lower alkoxy)-2-tetrahydrofuroic acid esters, such as the methyl, ethyl, n-propyl, and n-butyl esters of 2,5-dimethoxy-2-tetrahydrofuroic acid, 2,5-diethoxy-2-tetrahydrofuroic acid, and 2,5-di(n-propoxy)-2-tetrahydrofuroic acid. These 2,5-dialkoxy-2-tetrahydrofuroic acid esters are reacted in accordance with the method of this invention with an ester of acetic acid, such as a lower alkyl acetate (e. g. methyl acetate) in the presence of a condensing agent such as an alkali metal (e. g. sodium), an alkali metal alkoxide (e. g. sodium methoxide), or an alkali metal amide (e. g. sodamide). This reaction is optimally, but not necessarily, conducted at an elevated temperature (such as a temperature in the range of 40° C. to 100° C.) to speed the rate of reaction.

The 2,5-dialkoxy-2-tetrahydrofuroyl acetic acid esters, thus formed, wherein the 2,5-dialkoxy substituents correspond to those of the 2,5-dialkoxy radicals of the furoic acid ester reactant and the alcohol moiety of the ester grouping corresponds to the alcohol moiety of the acetate reactant, are new compounds. Representative of these new intermediates are the lower alkyl 2,5-di(lower alkoxy)-2-terthydrofuroyl acetic acid esters, such as the methyl, ethyl, n-propyl, and n-butyl esters of 2,5-dimethoxy-2-tetrahydrofuroyl acetic acid, 2,5-diethoxy-2-tetrahydrofuroyl acetic acid, and 2,5-di(n-propoxy)-2-tetrahydrofuroyl acetic acid. These 2,5-dialkoxy-2-tetrahydrofuroyl acetic acid esters are then hydrolyzed with an aqueous acid, such as dilute mineral acid (e. g. dilute hydrochloric acid or dilute sulfuric acid) to yield a mixture of 2,3-dihydroxybenzoic acid and an ester thereof, wherein the alcohol moiety of the ester corresponds to the alcohol moiety of the acetic acid ester reactant.

The 2,3-dihydroxybenzoic acid and its esters are known compounds which are disclosed, inter alia, in Archiv der Pharmazie, 269, 545–566 (1931).

The following examples are illustrative of the invention:

EXAMPLE 1

*2,5-dimethoxy-2-tetrahydrofuroyl acetic acid methyl ester (II)*

28.5 g. of 2,5-dimethoxy-2-tetrahydrofuroic acid methyl ester (I) is placed in a flask fitted with a stirrer, dropping funnel and a reflux condenser and heated with stirring to 90° C. 0.7 mm. sodium wire (18.5 g., 0.81 mole) and 34.1 g. of methyl acetate are added at 30–60 minutes intervals in six portions of equal size. During each addition of sodium the stirring is stopped. As the reaction mixture becomes more and more viscous, benzene (70 ml. in all) is added. After the reaction, methanol (30 ml.) is added dropwise to remove residual sodium and the mixture left standing with stirring and heating over-night. The solution is cooled to −10° C. and poured with effective stirring into a mixture of concentrated hydrochloric acid (90 g., 0.89 mole) and 170 g. of cracked ice. The dark brown mixture is extracted rapidly with cold ether and the etheral solution washed with a 2 M solution of potassium bicarbonate (300 ml.) and dried with magnesium sulfate. The ether is removed by distillation and the residue distilled further under 0.1–0.2 mm. from an oil bath (60–120°). About 24 g. (69%) of 2,5-dimethoxy-2-tetrahydrofuroyl acetic acid methyl ester (II) is obtained (light-yellow liquid, B. P. 0.1 mm. about 98–99° C., $n_D^{25}$ 1.4559).

$C_7H_7O_3(OCH_3)_3$ (232.2): Calc.—C, 51.7; H, 6.9; $OCH_3$, 40.1. Found—C, 52.8; H, 7.3; $OCH_3$, 38.8.

In a similar manner, if 2,5-diethoxy-2-tetrahydrofuroic acid ethyl ester is substituted for the 2,5-dimethoxy-2-tetrahydrofuroic acid methyl ester in the procedure of Example 1, 2,5-diethoxy-2-tetrahydrofuroic acetic acid ethyl ester is produced.

EXAMPLE 2

*2,3-dihydroxybenzoic acid methyl ester (III) and 2,3-dihydroxybenzoic acid (IV)*

1.00 g. of 2,5-dimethoxy-2-tetrahydrofuroyl acetic acid methyl ester is heated under reflux (15 minutes) with sulfuric acid (0.1 N, 5 ml.). After cooling, a precipitate is removed by filtration, washed with water and dried. The yield is about 500 mg. (69%) of 2,3-dihydroxybenzoic acid methyl ester (almost white crystals, M. P. about 73–74°).

$C_7H_5O_3(OCH_3)$ (168.1): Calc.—C, 57.1; H, 4.8; $OCH_3$, 18.5. Found—C, 56.9; H, 5.0; $OCH_3$, 17.1.

The product gives a blue ferric chloride reaction. After crystallization from benzene-petroleum ether the M. P. is raised to about 77–78° (previously found 78–79°).

The mother liquor is heated further under reflux (10 min.) and continuously extracted with ether. Hereby about 50 mg. (8%) of 2,3-dihydroxybenzoic acid is isolated (white crystals, M. P. about 204–205°).

$C_7H_6O_4$ (154.1): Calc.—C, 54.6; H, 3.9. Found—C, 54.7; H, 4.1.

The product gives a violet ferric chloride reaction. After crystallization from benzene the M. P. is raised to about 207° (previously found 206°).

Similarly, 2,5-diethoxy-2-tetrahydrofuroyl acetic acid ethyl ester gives the free acid and its ethyl ester.

The invention may be variously otherwise embodied within the scope of the appended claims.

I claim:
1. 2,5-di(lower alkoxy)-2-tetrahydrofuroyl acetic acid ester.
2. Lower alkyl 2,5-di(lower alkoxy)-2-tetrahydrofuroyl acetate.
3. Methyl 2,5-dimethoxy-2-tetrahydrofuroyl acetate.
4. The process for preparing a 2,5-di(lower alkoxy)-2-tetrahydrofuroyl acetic acid ester which comprises heating the corresponding 2,5-di(lower alkoxy)-2-tetrahydrofuroic acid ester with acetate in the presence of a condensing agent.
5. The process of claim 4 wherein the condensing agent is selected from the class consisting of an alkali metal, an alkali metal alkoxide, and an alkali metal amide.
6. The process of claim 5 wherein the acetate is lower alkyl acetate.
7. The process of claim 5 wherein methyl 2,5-dimethoxy-2-tetrahydrofuroic acid ester is reacted with methyl acetate.
8. The process for preparing 2,3-dihydroxybenzoic acid and an ester thereof which comprises hydrolyzing 2,5-di(lower alkoxy)-2-tetrahydrofuroyl acetate.
9. The process of claim 8 wherein methyl 2,5-dimethoxy-2-tetrahydrofuroyl acetate is hydrolyzed.

No references cited.